United States Patent

Ajmera et al.

(10) Patent No.: US 10,049,152 B2
(45) Date of Patent: Aug. 14, 2018

(54) GENERATING NATURAL LANGUAGE DIALOG USING A QUESTIONS CORPUS

(71) Applicant: International Business Machines Corporation, Armonk, NY (US)

(72) Inventors: Jitendra Ajmera, Bangalore (IN); Ajay K. Gupta, New Delhi (IN); Sachindra Joshi, Gurgaon (IN); Shubham Toshniwal, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 14/864,057

(22) Filed: Sep. 24, 2015

(65) Prior Publication Data

US 2017/0091312 A1    Mar. 30, 2017

(51) Int. Cl.
*G06F 17/30* (2006.01)
*G06F 17/27* (2006.01)

(52) U.S. Cl.
CPC ...... *G06F 17/30654* (2013.01); *G06F 17/271* (2013.01); *G06F 17/2785* (2013.01)

(58) Field of Classification Search
CPC ............... G06F 17/271; G06F 17/2715; G06F 17/2785; G06F 17/2818
USPC .................................................. 704/4, 9, 10
See application file for complete search history.

(56) References Cited

U.S. PATENT DOCUMENTS

| | | | |
|---|---|---|---|
| 2003/0200094 A1 | 10/2003 | Gupta et al. | |
| 2004/0133568 A1* | 7/2004 | Witkowski | G06F 17/246 |
| 2007/0055661 A1* | 3/2007 | Witkowski | G06F 17/246 |
| 2010/0017392 A1* | 1/2010 | Dian | G06F 17/30675 |
| | | | 707/E17.008 |
| 2010/0125562 A1* | 5/2010 | Nair | G06F 17/3089 |
| | | | 707/709 |
| 2012/0303356 A1 | 11/2012 | Boyle et al. | |
| 2013/0144890 A1 | 6/2013 | Liu | |
| 2014/0072947 A1 | 3/2014 | Boguraev et al. | |
| 2015/0205858 A1* | 7/2015 | Xie | G06Q 50/01 |
| | | | 707/755 |
| 2015/0227619 A1* | 8/2015 | Xie | G06F 17/30864 |
| | | | 707/706 |
| 2017/0091312 A1* | 3/2017 | Ajmera | G06F 17/30654 |

FOREIGN PATENT DOCUMENTS

WO    2014150214 A2    9/2014

OTHER PUBLICATIONS

Oh et al.; "Stochastic Language Generation for Spoken Dialogue Systems"; Proceedings of the 2000 ANLP/NAACL Workshop on Conversational systems; May 4, 2000; pp. 27-32; vol. 3; Stroudsburg, PA.

* cited by examiner

*Primary Examiner* — Michael N Opsasnick
(74) *Attorney, Agent, or Firm* — Stephen R. Yoder (57) ABSTRACT

Generating a natural language dialog by finding missing semantic information in a user question by comparing it to the closest question available in a question corpus. Incrementally improved question precision is targeted during each round of the natural language dialog by generating follow-up questions that clarify semantic and syntactic characteristics of the user question. The follow-up questions are derived from analysis of the user question to identify areas of improvement on the user question.

20 Claims, 6 Drawing Sheets

GENERATING NATURAL LANGUAGE DIALOG USING A QUESTIONS CORPUS

BACKGROUND

The present invention relates generally to the field of computer systems, and more particularly to dialog systems.

A dialog system or conversational agent is a computer system programmed for conversing with a human by using a coherent structure. Dialog systems have employed text, speech, graphics, haptics, gestures, and other modes for communication on both the input and the output channels.

Natural language processing (NLP) is a field of computer science, artificial intelligence, and linguistics concerned with the interactions between computers and human (natural) languages. Generally speaking, NLP systems use machine learning to analyze and derive meaning from textual corpora (that is, sets of textual content). Natural language dialog systems create natural interaction mechanisms for human-computer interactions. State of the art rule-based dialog systems rely on manually-developed rules.

A parse tree (also known as a parsing tree or derivation tree) is an ordered, rooted tree that represents the syntactic structure of a string according to some context-free grammar. Parse trees have structure and elements that reflect the syntax of the input language. Parse trees are based on similar principles as sentence diagrams, which are often used for grammar teaching in schools.

SUMMARY

In one aspect of the present invention, a method, a computer program product, and a system includes: (i) computing a set of target syntax features based on a target question; (ii) identifying a first set of reference syntax features based on a first reference question; (iii) identifying a second set of reference syntax features based on a second reference question; (iv) selecting the first set of reference syntax features based, at least in part, on the set of target syntax features being more similar to the first set of reference syntax features when compared to the second set of reference syntax features; (v) determining a set of missing syntax features based at least in part on a comparison of the set of target syntax features and the first set of reference syntax features; (vi) computing a first weight for a first missing syntax feature of the set of missing syntax features and a second weight for a second missing syntax feature of the set of missing syntax features; and (vii) responsive to the first weight being higher than the second weight, determining a follow-up question based at least in part on a semantic analysis of the target question and the first missing syntax feature.

DETAILED DESCRIPTION

Generating a natural language dialog by finding missing semantic information in a user question by comparing it to the closest question available in a question corpus. Incremental improved question precision is targeted during each round of dialog. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
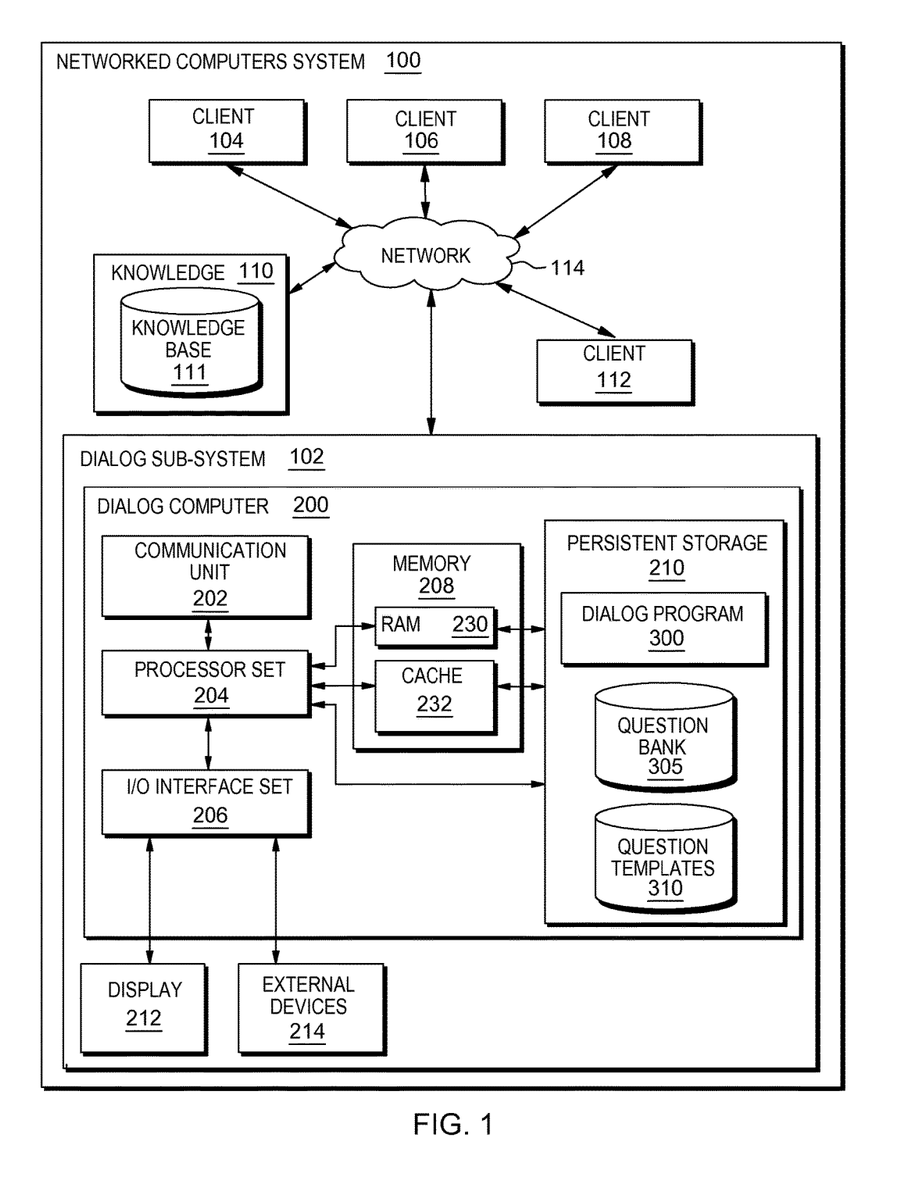
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: dialog sub-system 102; client sub-systems 104, 106, 108, 112; knowledge sub-system 110; knowledge base 111; communication network 114; dialog computer 200; communication unit 202; processor set 204; input/output (I/O) interface set 206; memory device 208; persistent storage device 210; display device 212; external device set 214; random access memory (RAM) devices 230; cache memory device 232; dialog program 300; question bank 305; and question templates 310.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Dialog program 300 operates to make use of natural language processing for understanding user requirements, both syntactically and semantically. This understanding is developed by generating follow-up questions that clarify an original question as-input by a user. The follow-up questions are determined by identifying a matching question from a well-formulated set of questions. In that way, the missing semantic information in a user query is found with the closest match. The missing information is then used for generating the natural language dialog, which includes asking a follow-up question to enhance the subsequent response that may, in some examples, be made by a different cognitive computing system.

Some embodiments of the present invention recognize the following facts, potential problems and/or potential areas for improvement with respect to the current state of the art: (i) natural language conversation systems are used for replacing interactive voice response (IVR) for task completions (e.g. knowing account balance, ticket booking); (ii) natural language conversation systems are used for virtual assistants (e.g. self-help for enterprises, troubleshooting); (iii) natural language conversation systems are used for information processing systems (e.g. SQL querying, question/answering systems); (iv) getting an ontology for comparing terms of a question is a more complex task than getting reference questions; and/or (v) limitation to a single domain often falls short of providing a responsive answer to a user query, for example, if looking only to the travel domain, the response may be restricted to airports, travel dates, and so forth.

An example scenario where some embodiments of the present invention are applied follows. A user, Able, queries a computing system with the question, "who won the cricket world cup?" In one conventional web search query, the response is a list of ten hyperlinks that direct the user to potentially relevant web sites. Another conventional response from a cognitive computing system is an uncertain response, which may, upon receiving extra evidence, be the result for the most recent cricket world cup. Some embodiments of the present invention analyze the question for both semantic and syntactic characteristics to respond, "For which year do you want to know the cricket world cup winner?" It can be seen in this example how some embodiments of the present invention support queries of a knowledge base by interactively formatting a user's original question via dialog to produce a question better suited for querying the knowledge base.

Some embodiments of the present invention allow a dialog system to be created by using a set of well-formulated questions in a given domain. Some embodiments of the present invention generate a natural language dialog by finding missing semantic information in the user question by comparing it to the closest question in a question corpus. For example, a user's question is compared with a closest question in a question corpus to find missing semantic information. However, some embodiments of the present invention do not assume a question corpus consisting of domain expert behavior and function without it. Further, in some embodiments, a dialogue manager discovers missing attributes and/or values by matching user input with reference questions stored, for example, from historic user queries.

The deployment of conversational systems, such as the dialog system disclosed herein, is scalable for use in moderate to high complexity domains because the system engages the user with follow-up questions to clarify the objective(s) of the user and to use more precise language in the query.

Figure 2:
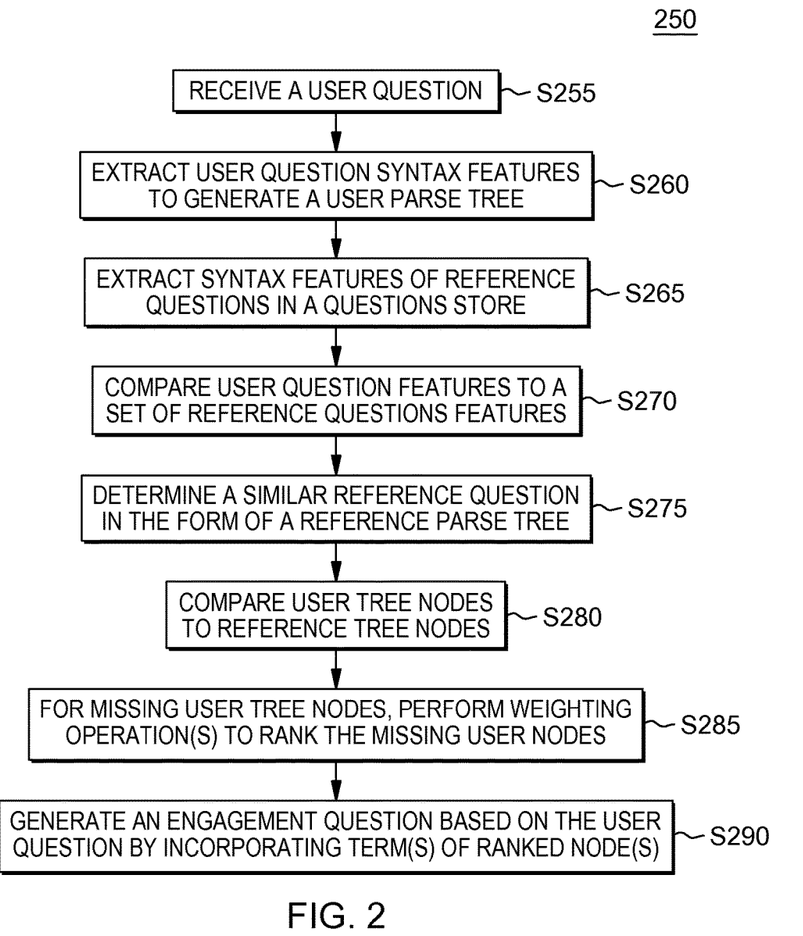
FIG. 2 is a flowchart showing a method performed, at least in part, by the first embodiment system.
Figure 3:
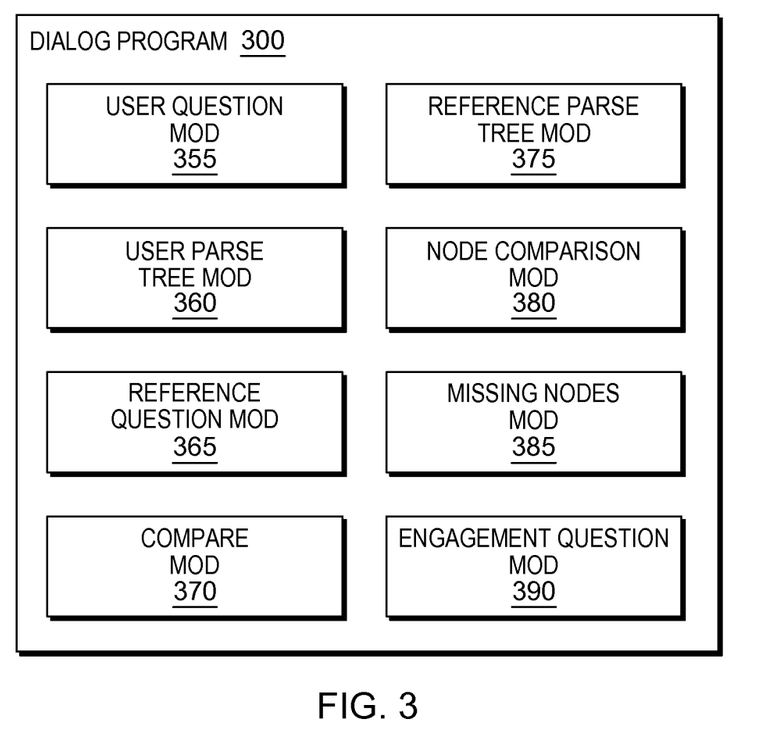
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where user question module ("mod") 355 receives a user question. Oftentimes, the question is received as a query directed to a domain-specific knowledge base, such as knowledge base 111 (FIG. 1). However, as discussed further herein, some embodiments of the present invention provide a dialog system for improving query language through natural language dialog with the user regardless of the domain to which the question is directed. In this example, the user question mod receives a query from a user with no particular domain identified.

Figure 6:
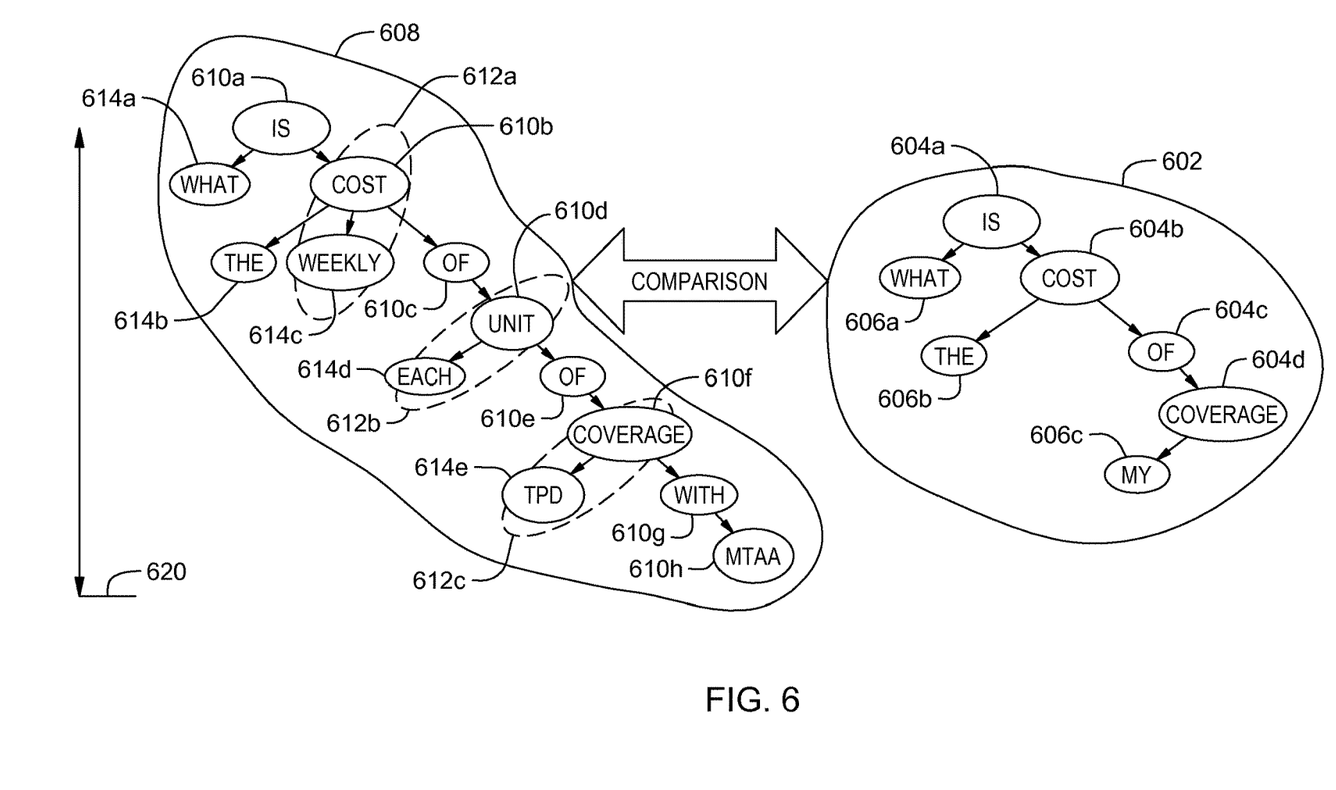
FIG. 6 is a tree diagram showing information that is generated by and/or helpful in understanding embodiments of the present invention.

Processing proceeds to step S260, where user parse tree mod 360 extracts user question syntax features to generate a user parse tree. An example user parse tree is shown in FIG. 6 as test tree 602. As discussed above, a conventional parse tree provides the basis for identifying syntax features. Any parsing software that produces an organized structure of the features of a given query may be used to extract syntax features to complete this process action. In some embodiments, syntax features are expressed as vector representations to support comparison of the various features of a one parse tree with that of another parse tree.

Processing proceeds to step S265, where reference question mod 365 extracts syntax features of reference questions in a question store. It should be noted that the resulting organized structure of the features of both the user question and the reference questions are similar so that they may be compared during subsequent processing to support the natural language dialog portion of the dialog system and a refined query that may result from the dialog.

Processing proceeds to step S270, where compare mod 370 compares the user question features to a set of reference questions features. As stated above, the features of each question involved is formatted in a similar way such that comparison of the questions is effective. Factors included when comparing the various features of reference questions to the features of the user question include: (i) semantic similarity; (ii) syntactic similarity; (iii) keywords; (iv) relationships between words; (v) proximity of one word with another word; (vi) computed "distance" between the user question feature set and the reference question feature sets; (vii) tf-idf analysis.

Processing proceeds to step S275, where reference parse tree mod 375 determines a similar reference question in the form of a reference parse tree. The similar reference question is determined according to comparison data produced by compare mod 370 in step S270, above. A reference parse tree is established using the reference question that is selected as being similar to the user question.

Processing proceeds to step S280, where node comparison mod 380 compares user parse tree nodes to reference parse tree nodes. In this example, parse trees are used for making comparisons and drawing conclusions in later processing that lead to natural language dialog with the user. Alternative question structures may be used to serve a similar purpose as the parse tree of this example. Each parse tree is made up of various nodes, identified by keywords. These keywords oftentimes include additional words from the corresponding question that branch off from the node. It is the structure of the two parse trees in question, including the makeup of the various branches and arrangement of the nodes, that are compared by the node comparison mod. In this example, the missing nodes are identified during the comparison. Alternatively, word form differences are identified between one node of the user tree and another similar node of the reference tree. Alternatively, adjectives of similar words are compared from the user tree with the reference tree to identify differences (or lack of adjectives, in some cases). Alternatively, missing entities are identified during the comparison. Parse trees and comparison of a reference tree to a test tree (the user parse tree) are discussed in more detail below with respect to FIG. 6.

Processing proceeds to step S285, where missing nodes mod 385 draws from the comparison performed in step S280 to perform weighting operation(s) to rank missing user nodes. The process of ranking is performed on variances between the user question and the reference question according to a desirable characteristic. In this example, the variances are ranked according to an importance with respect to a semantically correct sentence. Alternatively, the importance is directed to precision of the question. Alternatively, missing nodes are ranked according to proximity to the root of the parse tree. As discussed in more detail below, weighting the missing nodes takes into account one or more of: (i) distance from the root; (ii) tf-idf (term frequency—inverse document frequency) score; and/or (iii) part of speech, which is an example of a word type (noun, determiner, pronoun, verb, adjective, adverb, preposition, and conjunction).

Processing ends at step S290, where engagement question mod 390 generates an engagement question based on the user question by incorporating term(s) of ranked node(s). Natural language processing is performed by conventional techniques and/or programs now known or to be known in the future. Having a weighted set of terms and corresponding placement of those terms within the user question, the engagement question mod applies natural language process to generate a question to be directed to the user that will lead to improvement in the user question. In this example, the missing user node that is ranked as the most important is the subject of a first natural language dialog in later processing actions. Alternatively, the top two missing user nodes are combined in a single engagement dialog. Alternatively, adjectives are addressed in the first engagement question. It should be understood that a first follow-up question may lead to additional follow-up questions before a final modified user question is prepared for use. Some embodiments of the present invention use the final modified user question as a query for a knowledge base of a particular domain.

Figure 4:
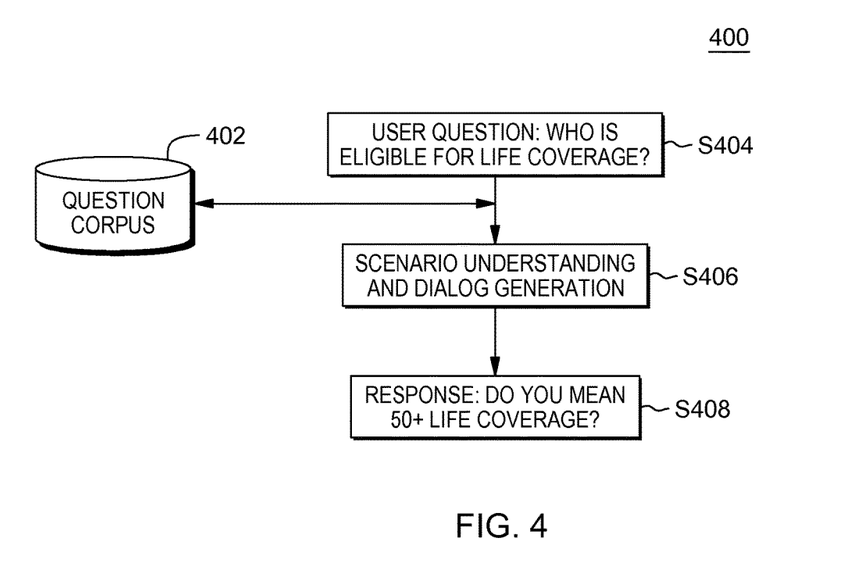
FIG. 4 is a flowchart of a first embodiment of a method according to the present invention.
Figure 5:
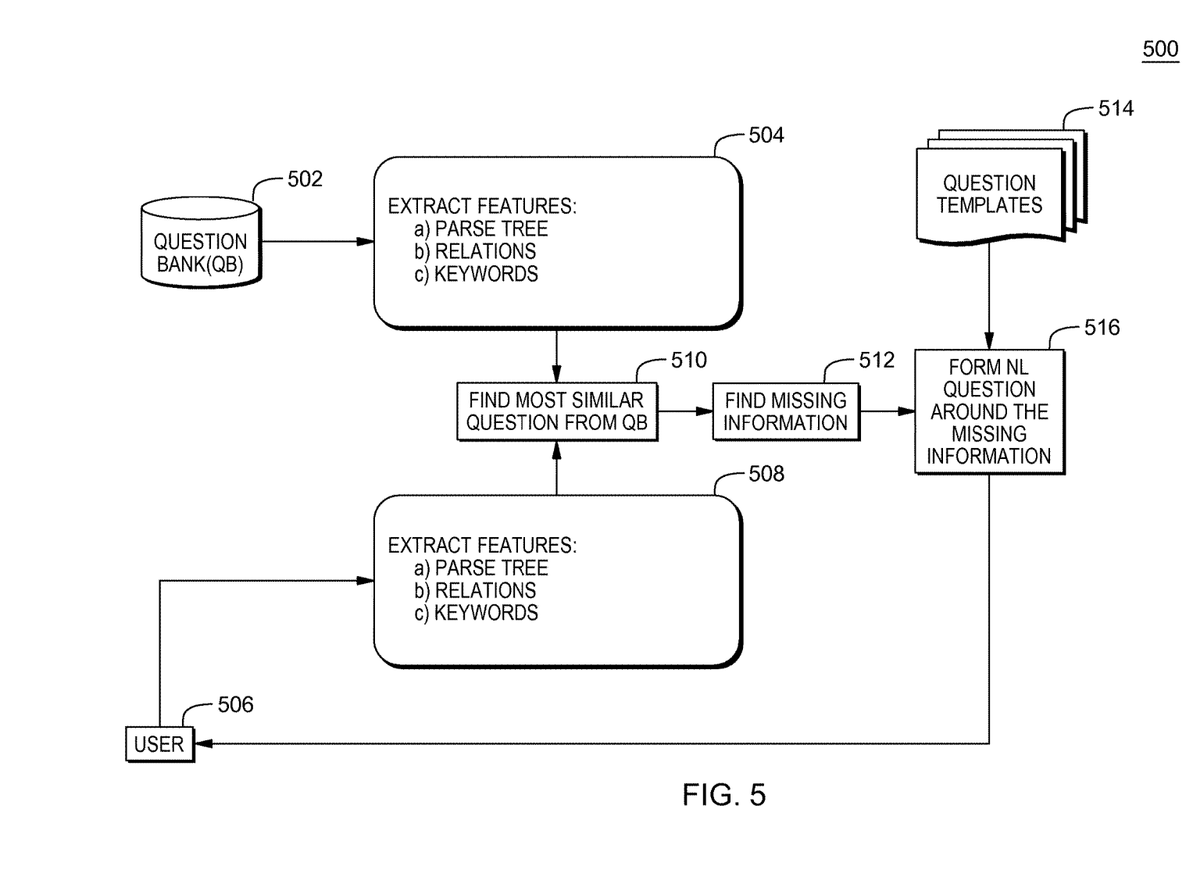
FIG. 5 is a block diagram of a second embodiment of a system according to the present invention.

Further embodiments of the present invention are discussed in the paragraphs that follow and with reference to FIGS. 4-6.

FIG. 4 shows process 400, depicting a method according to the present invention. In this method, a user queries at step S404, "who is eligible for life coverage?" Processing proceeds to step S406, where the dialog system of this example applies semantic analysis to understand the scenario being contemplated and further applies syntactic analysis to generate a dialog to determine a more precise question that will more likely produce a responsive answer for the user. During this process, question corpus 402 is addressed to generate a next question, or a follow-up question, directed to the user. Table 1 is a list of some questions found in the question corpus that is consulted during this example process. Processing proceeds to step S408, where the dialog system responds to the user with the question "Do you mean 50+ life coverage?" As can be seen in the table, the term "life coverage" is always preceded with the term "50+," which serves to clarify the meaning of the term "life coverage." Also, question number 5 of the question corpus includes each of the terms with the exception of "50+." If the user responds positively to this follow-up question, the knowledge base may be queried with the question "Who is eligible for 50+ life coverage?" The example ends at this step, but subsequent questions and answers may further clarify the question that the dialog system may then query a knowledge base for the answer.

TABLE 1

Example Question Corpus.

| NO. | QUESTION |
|---|---|
| 1 | What is ANZ 50+ life coverage? |
| 2 | Why do I need ANZ 50+ life coverage? |
| 3 | What is the life benefit? |
| 4 | What is an accidental death benefit? |
| 5 | Who is eligible for 50+ life coverage? |
| 6 | When are benefits paid out? |
| 7 | What is the minimum amount of coverage I can apply for? |
| 8 | What is the maximum level of coverage I can apply for? |
| 9 | What is a benefit limitation? |
| 10 | What if I want more coverage? |
| 11 | Is there any wait period? |
| 12 | When does coverage begin? |
| 13 | Can I cancel my coverage? |
| 14 | When does the coverage and the policy end? |
| 15 | Can I increase or decrease their level of coverage? |
| 16 | Can my spouse be covered also? |
| 17 | Are there any exclusions? |
| 18 | Will I be covered overseas? |
| 19 | Can I nominate a beneficiary? |
| 20 | Can I nominate a charity as a beneficiary? |
| 21 | How is the premium calculated? |
| 22 | What is the premium payment option available? |
| 23 | What does the Standard premium option mean? Can you give me some examples? |
| 24 | What does the Capped premium option mean? Can you give me some examples? |

FIG. 5 shows dialog system 500 for performing at least some of the process shown in the flowchart of FIG. 4. In this example, the question corpus in FIG. 4 is found in question bank 502. Extract features module 504 extracts features from questions in the question bank. These features are used to create a parse tree, or similar structure, for breaking the questions down into linked components based on natural language. When user 506 queries the dialog system, extract module 508 extracts the features of the query, similar to the way questions in the question bank are processed. The user question is parsed as a "test tree" against which the parsed questions are compared. The most similar question from the question bank is identified by similar question module 510 as a reference for modifying the original query of the user.

Missing information module 512 determines what information is "missing" from the test tree, but present in the tree of the most similar question. Question templates 514 are consulted by form question module 516 to identify a best form of the question and to add any necessary additional information that is found to be missing by the missing information module. The modified question is presented to the user, or a question that supports a potential change to the query is presented to the user. For example, as shown in FIG. 4, the dialog system merely asks whether 50+ life coverage is the object of the question. Alternatively, the dialog system asks "Are you asking who is eligible for 50+ life coverage?"

Some embodiments of the present invention engage with the user towards understanding the user's requirements such that the requirements are suitable to be addressed by the end application. Dialog systems conventionally involve hand written rules and flows that are not scalable to large and open requirements. As illustrated in FIGS. 4 and 5, some embodiments of the present invention create an engagement dialog from a question corpus.

In the example embodiment parse trees of FIG. 6, follow-up questions are formed through analysis of a user's question. Here, parse trees of the question space are regarded as reference templates. Essentially, reference tree 608 is compared to test tree, or input tree, 602. The example is based on a user query "What is the cost of my coverage." The user query is processed as user parse tree 602. The user parse tree includes user tree nodes 604a, 604b, 604c, and 604d. The user parse tree includes branches leading to user branch terms 606a, 606b, and 606c.

The most similar question in the question bank is processed as reference question tree 608. In this example, the most similar question in the question bank is "what is the weekly cost of each unit of TPD coverage with MTAA?" The reference tree nodes of reference question tree 608 are shown as 610a, 610b, 610c, 610d, 610d, 610e, 610f, 610g, and 610h. The reference question tree includes a number of branches leading to reference branch terms 614a, 614b, 614c, 614d, and 614e.

Tree nodes are weighted by their importance using a technique such as tf-idf. Given an incoming question, the corresponding parse tree is a test tree against which other questions, in the form of parse trees, are compared to identify a similar question. In some embodiments, when comparing trees and weighting nodes, those nodes that are closest to base 620 are generally the more important nodes. As the nodes are more distant from the base, the nodes and the corresponding terms take on an optional character in that they may be helpful, but should not be considered as important. It should be noted that the form and orientation of the individual parse tree is dependent on user preference and the resulting interpretation of the individual parse tree will be based on it's individual design.

After finding the most similar reference tree according to the comparison, nodes that are missing from the test tree are identified. Information missing from the user question is identified in the Figure as reference slots 612a, 612b, and 612c. In this embodiment, the process proceeds to weigh the nodes using queues, or factors, such as: (i) distance from the root; (ii) tf-idf score; and (iii) type (noun-noun-modifier, noun-adjective-modifier).

With reference to the weighted nodes, engagement questions are formed using the parse trees. Questions corresponding to various types of missing information can be formed using templates. For example, the noun-noun-modifier is clarified using plural/singular rules with the question, "is it TPD coverage."

Some embodiments of the present invention are directed to automatically generating natural language dialog where no manual creation of templates is required.

Some embodiments of the present invention are directed to automatically generating natural language dialog where a dialog is generated by finding most similar question from a question corpus in that domain and finding missing information.

Some embodiments of the present invention are directed to automatically generating natural language dialog where arbitrary dialog can be generated at any depth of communication without writing complex flows.

Some embodiments of the present invention may include one, or more, of the following features, characteristics and/or advantages: (i) makes the deployment of conversational systems most scalable; (ii) compares a user question with a reference question to find semantic information about the user question; (iii) does not assume the availability of a question-answering (QA) system; (iv) does more than use a syntactic or common-sense approach to develop the user's question, such as word A is a synonym of word B; (v) finds "semantic" information missing from the user's question, such as "what type of cuisine are you looking for," (vi) outputs a dialog with the user; (vii) does more than generate meaningful system prompts given the keywords (attributes and values) (the input keywords come from a dialogue manager); (viii).

Some Helpful Definitions Follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Natural Language: any language used by human beings to communicate with each other.

Natural Language Processing: any derivation of meaning from natural language performed by a computer.

What is claimed is:

1. A method comprising:
   receiving a target question in a natural language dialog from a human user;
   computing a set of target syntax features based on the target question;
   identifying a first set of reference syntax features based on a first reference question;
   identifying a second set of reference syntax features based on a second reference question;
   selecting the first set of reference syntax features based, at least in part, on the set of target syntax features being more similar to the first set of reference syntax features when compared to the second set of reference syntax features;
   determining a set of missing syntax features based at least in part on a comparison of the set of target syntax features and the first set of reference syntax features;
   computing a first weight for a first missing syntax feature of the set of missing syntax features and a second weight for a second missing syntax feature of the set of missing syntax features;
   responsive to the first weight being higher than the second weight, determining a follow-up question based at least in part on a semantic analysis of the target question and the first missing syntax feature; and
   displaying, by a computer, the follow-up question to the human user.

2. The method of claim 1, wherein the set of target syntax features, the first set of reference syntax features, and the second set of reference syntax features are each in the form of a parse tree.

3. The method of claim 1, wherein selecting the first set of reference syntax features includes:
   determining a first count of reference syntax features for the first set of reference syntax features that match at least one target syntax feature of the set of target syntax features; and
   determining a second count of reference syntax features for the second set of reference syntax features that match at least one target syntax feature of the set of target syntax features;
   wherein:
   the set of target syntax features are more similar to the first set of reference syntax features than the second set of reference syntax features at least because the first count of reference syntax features is greater than the second count of reference syntax features.

4. The method of claim 1, wherein selecting the first set of reference syntax features includes:
   determining a first count of missing reference syntax features for the first set of reference syntax features that are not present in the set of target syntax features; and
   determining a second count of missing reference syntax features for the second set of reference syntax features that are not present in the set of target syntax features;
   wherein:
   the set of target syntax features are more similar to the first set of reference syntax features than the second set of reference syntax features at least because the first count of missing reference syntax features is smaller than the second count of missing reference syntax features.

5. The method of claim 1, wherein:
   the first weight is determined according to a pre-determined weight of a first word type corresponding to the first missing syntax feature; and
   and the second weight is determined according to a pre-determined weight of a second word type corresponding to the second missing syntax feature.

6. The method of claim 5, wherein the word type is selected from the group consisting of a noun, a determiner, a pronoun, a verb, an adjective, an adverb, a preposition, and a conjunction.

7. The method of claim 1, wherein:
   the first reference question and the second reference question are identified in a historical user query store as well-formulated questions; and
   the historical user query store includes questions previously received from users including the first reference question and the second reference question.

8. A computer program product comprising a non-transitory computer-readable storage medium having a set of instructions stored therein which, when executed by a processor, causes the processor to perform the following steps:

receiving a target question in a natural language dialog from a human user;

computing a set of target syntax features based on the target question;

identifying a first set of reference syntax features based on a first reference question;

identifying a second set of reference syntax features based on a second reference question;

selecting the first set of reference syntax features based, at least in part, on the set of target syntax features being more similar to the first set of reference syntax features when compared to the second set of reference syntax features;

determining a set of missing syntax features based at least in part on a comparison of the set of target syntax features and the first set of reference syntax features;

computing a first weight for a first missing syntax feature of the set of missing syntax features and a second weight for a second missing syntax feature of the set of missing syntax features;

responsive to the first weight being higher than the second weight, determining a follow-up question based at least in part on a semantic analysis of the target question and the first missing syntax feature; and displaying the follow-up question to the human user.

9. The computer program product of claim 8, wherein the set of target syntax features, the first set of reference syntax features, and the second set of reference syntax features are each in the form of a parse tree.

10. The computer program product of claim 8, wherein selecting the first set of reference syntax features includes:

determining a first count of reference syntax features for the first set of reference syntax features that match at least one target syntax feature of the set of target syntax features; and determining a second count of reference syntax features for the second set of reference syntax features that match at least one target syntax feature of the set of target syntax features;

wherein:

the set of target syntax features are more similar to the first set of reference syntax features than the second set of reference syntax features at least because the first count of reference syntax features is greater than the second count of reference syntax features.

11. The computer program product of claim 8, wherein selecting the first set of reference syntax features includes:

determining a first count of missing reference syntax features for the first set of reference syntax features that are not present in the set of target syntax features; and determining a second count of missing reference syntax features for the second set of reference syntax features that are not present in the set of target syntax features;

wherein:

the set of target syntax features are more similar to the first set of reference syntax features than the second set of reference syntax features at least because the first count of missing reference syntax features is smaller than the second count of missing reference syntax features.

12. The computer program product of claim 8, wherein:

the first weight is determined according to a pre-determined weight of a first word type corresponding to the first missing syntax feature; and and the second weight is determined according to a pre-determined weight of a second word type corresponding to the second missing syntax feature.

13. The computer program product of claim 12, wherein the word type is selected from the group consisting of a noun, a determiner, a pronoun, a verb, an adjective, an adverb, a preposition, and a conjunction.

14. A computer system comprising:

a processor set; and a computer readable storage medium;

wherein:

the processor set is structured, located, connected, and/or programmed to run program instructions stored on the computer readable storage medium; and the program instructions which, when executed by the processor set, cause the processor set to perform the following steps:

receiving a target question in a natural language dialog from a human user;

computing a set of target syntax features based on the target question;

identifying a first set of reference syntax features based on a first reference question;

identifying a second set of reference syntax features based on a second reference question;

selecting the first set of reference syntax features based, at least in part, on the set of target syntax features being more similar to the first set of reference syntax features when compared to the second set of reference syntax features;

determining a set of missing syntax features based at least in part on a comparison of the set of target syntax features and the first set of reference syntax features;

computing a first weight for a first missing syntax feature of the set of missing syntax features and a second weight for a second missing syntax feature of the set of missing syntax features;

responsive to the first weight being higher than the second weight, determining a follow-up question based at least in part on a semantic analysis of the target question and the first missing syntax feature; and displaying the follow-up question to the human user.

15. The computer system of claim 14, wherein the set of target syntax features, the first set of reference syntax features, and the second set of reference syntax features are each in the form of a parse tree.

16. The computer system of claim 14, wherein selecting the first set of reference syntax features includes:

determining a first count of reference syntax features for the first set of reference syntax features that match at least one target syntax feature of the set of target syntax features; and determining a second count of reference syntax features for the second set of reference syntax features that match at least one target syntax feature of the set of target syntax features;

wherein:

the set of target syntax features are more similar to the first set of reference syntax features than the second set of reference syntax features at least because the first count of reference syntax features is greater than the second count of reference syntax features.

17. The computer system of claim 14, wherein selecting the first set of reference syntax features includes:

determining a first count of missing reference syntax features for the first set of reference syntax features that are not present in the set of target syntax features; and determining a second count of missing reference syntax features for the second set of reference syntax features that are not present in the set of target syntax features;

wherein:
the set of target syntax features are more similar to the first set of reference syntax features than the second set of reference syntax features at least because the first count of missing reference syntax features is smaller than the second count of missing reference syntax features.

18. The computer system of claim 14, wherein:
the first weight is determined according to a pre-determined weight of a first word type corresponding to the first missing syntax feature; and
and the second weight is determined according to a pre-determined weight of a second word type corresponding to the second missing syntax feature.

19. The computer system of claim 18, wherein the word type is selected from the group consisting of a noun, a determiner, a pronoun, a verb, an adjective, an adverb, a preposition, and a conjunction.

20. The computer system of claim 14, wherein:
the first reference question and the second reference question are identified in a historical user query store as well-formulated questions; and
the historical user query store includes questions previously received from users including the first reference question and the second reference question.

* * * * *